(12) United States Patent
Lai

(10) Patent No.: US 7,007,962 B2
(45) Date of Patent: Mar. 7, 2006

(54) CHILD'S SWAYING BIKE

(75) Inventor: Aei-Sheng Lai, Taichung (TW)

(73) Assignee: Cargee Enterprises Co., Ltd., Taichung (TW)

( * ) Notice: Subject to any disclaimer, the term of this patent is extended or adjusted under 35 U.S.C. 154(b) by 0 days.

(21) Appl. No.: 10/829,942

(22) Filed: Apr. 23, 2004

(65) Prior Publication Data

US 2005/0236800 A1    Oct. 27, 2005

(51) Int. Cl.
*B62M 29/00*    (2006.01)
(52) U.S. Cl. ............... 280/218; 280/242.1; 280/87.01; 280/87.021
(58) Field of Classification Search ............... 280/200, 280/218, 242.1, 244, 87.01, 87.021, 62, 781, 280/785, 786
See application file for complete search history.

(56) References Cited

U.S. PATENT DOCUMENTS

| | | | | |
|---|---|---|---|---|
| 3,663,038 A | * | 5/1972 | Hendricks | 280/218 |
| 4,200,304 A | * | 4/1980 | Hwang | 280/218 |
| 4,930,796 A | * | 6/1990 | Harrod | 280/87.021 |
| 6,502,843 B1 | * | 1/2003 | Gu | 280/218 |
| 6,561,534 B1 | * | 5/2003 | Gu | 280/242.1 |

* cited by examiner

*Primary Examiner*—Matthew Luby
(74) *Attorney, Agent, or Firm*—Troxell Law Office, PLLC

(57) ABSTRACT

A child's swaying bike includes a seat, two rear rollers, a center rod, two front rollers, and a handlebar. The bike can move forward by swaying of the center rod to the right and the left. The handlebar can be pivotally connected quickly with the center rod by inserting a pivot to simplify the structure of the child's swaying bike. The handlebar has an intermediate horizontal potion and two L-shaped side portions extending from the two ends of the intermediate horizontal portion. The two L-shaped side portions are symmetrically positioned to let a child ride and sway safely and stably on the seat, designed to conform to ergonomics.

3 Claims, 8 Drawing Sheets

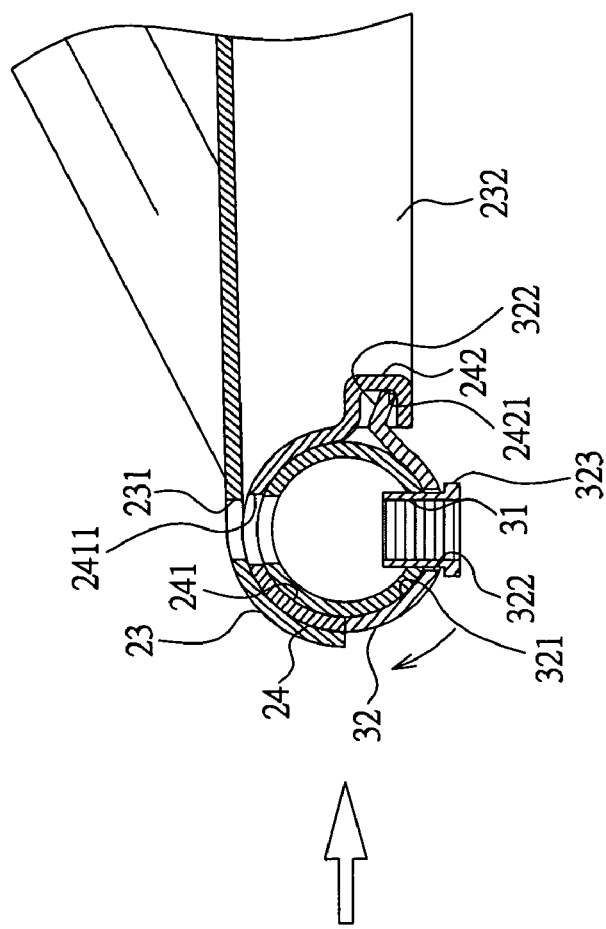
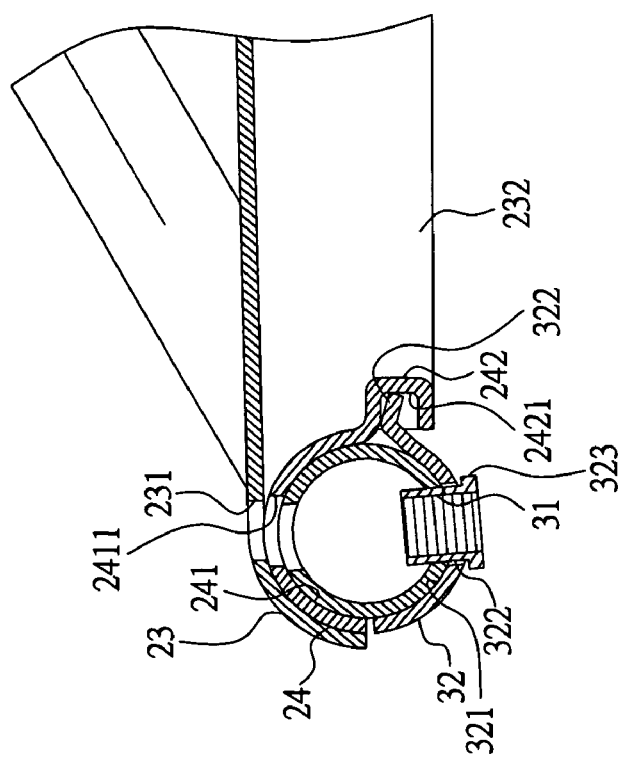
FIG.6

US 7,007,962 B2

CHILD'S SWAYING BIKE

BACKGROUND OF THE INVENTION

1. Field of the Invention

This invention relates to a child's swaying bike, particularly to one having an improved handlebar.

2. Description of the Prior Arts

A conventional child's swaying bike shown in FIG. 1 includes a seat 1, a center rod 2, and a handlebar 3. The seat 1 has two rear rollers 4 at two sides below the seat 1, and a front end pivotally connected with the center rod 2. The center rod 2 has its rear end pivotally connected with two front rollers 5, and a front end firmly welded with the handlebar 3. The handlebar 3 is inverted U-shaped and two tread sections 6 formed in an intermediate portion at two sides of the connected section with the center rod 2 for the two feet of a rider to tread on.

Then, a child sits on the seat 1, with the feet treading on the tread sections 6 of the handlebar 3, with the hands gripping two grips of the handlebar 7. The rider sways the handlebar 3 together with the center rod 2 to the right and the left side, moving the swaying bike forward in a swaying mode. It can attract children's curiosity and run in a swaying mode for exercise which can be very much liked and enjoyed by small children.

However, the conventional child's swaying bike has the following disadvantages.

1. The handlebar 3 and the center rod 2 are welded together, so the cost for packaging and transporting of the conventional child's swaying bike is rather high because of the large size of the handlebar making it impossible to be collapsed.

2. The handlebar 3 is U-shaped, with the two grips 7 extending horizontallly to be located near the two feet of a rider when the rider sits on the seat 1, with the feet treading on the treading portions 6. Therefore, when the rider sways the handlebar 2, the grips 7 are liable to collide with the feet, interfering with movement of the hands. Furthermore, the rider can hardly see the hands if the rider is watching straight forward in order not to to collide with someone or something, and the bike may easily go to contact, touch or collide with any obstacle at the two sides, and even worse, the hands may be hurt. Then the rider may be forced to sway less widely, thereby reducing with the thrill of riding. Besides, if the grips 7 are located too low, the child riding on it may have to incline the body forward a little to catch hold of them, but the rider still has to hold up the head for watching the front, possibly causing pain to their waist or headache, thereby not conforming to ergonomical design.

SUMMARY OF THE INVENTION

The main purpose of the invention is to offer a child's swaying bike, which has its handlebar improved, with the handlebar not colliding with things as possible at two sides of the bike in swaying, that is easy to handle, with the width of swaying increased to generate more thrill in riding.

The second purpose of the invention is to offer a child's swaying bike with its handlebar improved by provision of a position plate having a lateral engage groove and a position plate to corresponding to that of the center rod and have an insert member to fit in the engage groove for combining the handlebar with the center rod easily, and then the handlebar can rotate with the joint section as a pivot with function of the center of gravity to let the two position plates press each other to stop the handlebars in place stably without necessity of supporting the center rod, and then the both are tightened firmly together with bolts.

BRIEF DESCRIPTION OF DRAWINGS

This invention will be better understood by referring to the accompanying drawings, wherein:

FIG. 6 is a cross-sectional view of relative movement of a handlebar and a center rod in the present invention;

DETAILED DESCRIPTION OF THE PREFERRED EMBODIMENT

Figure 1:
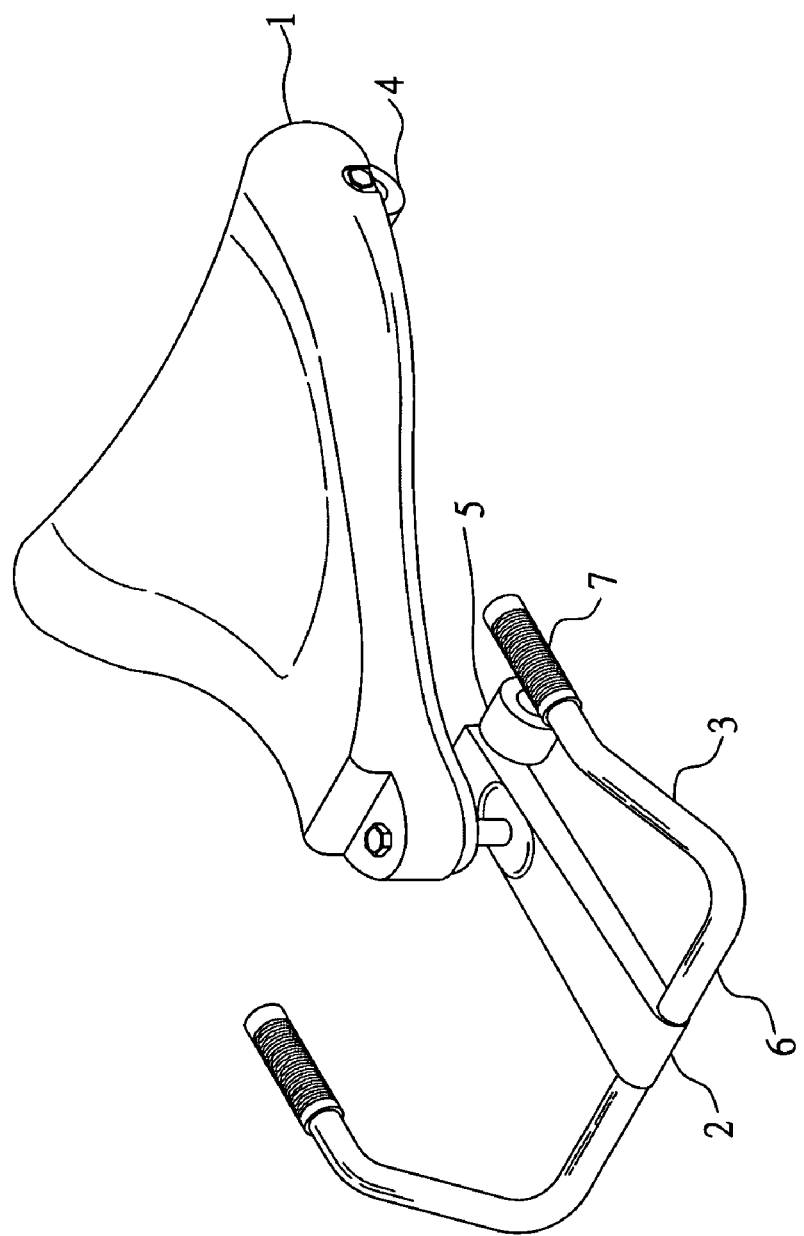
FIG. 1 is a perspective view of a conventional child's swaying bike.
Figure 2:
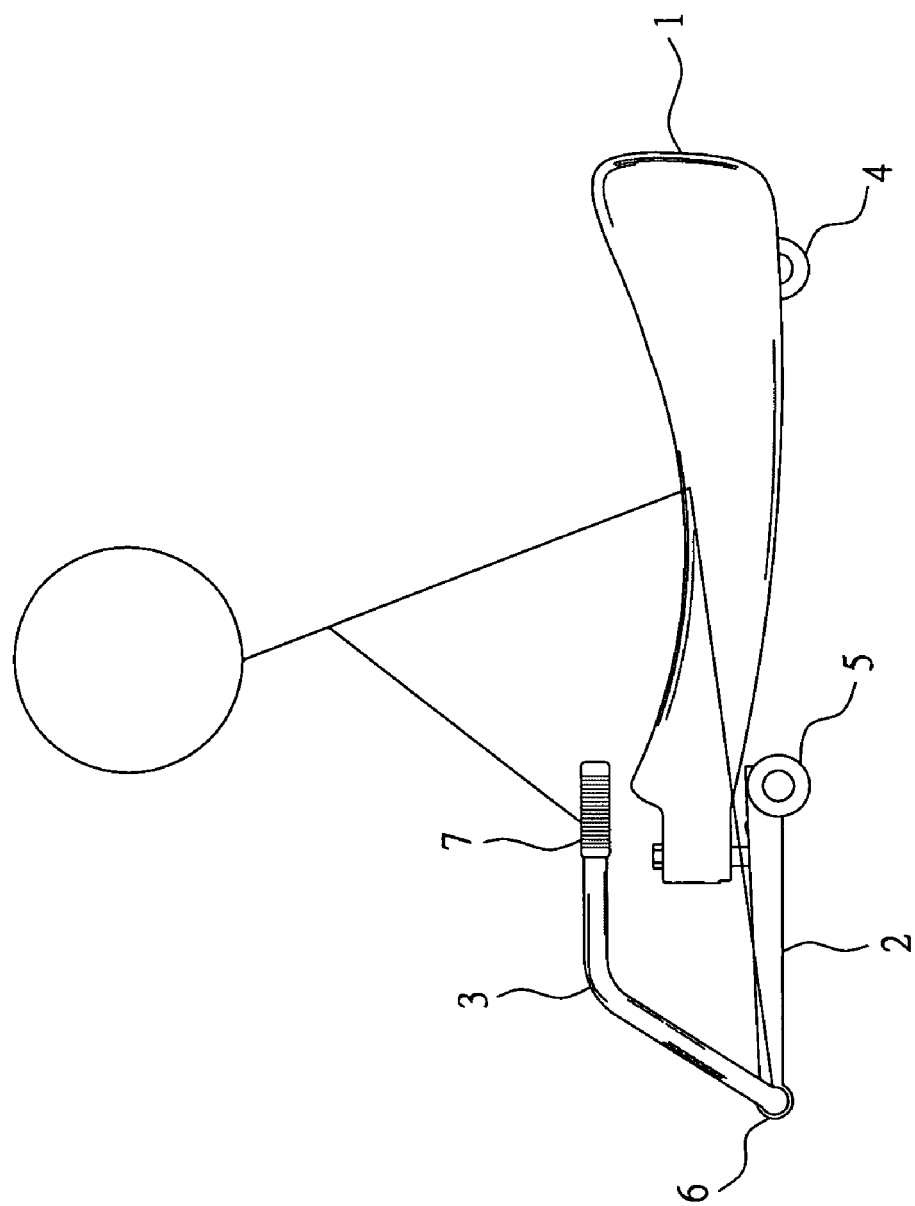
FIG. 2 is a side view of a child's swaying bike in the present invention.
Figure 3:
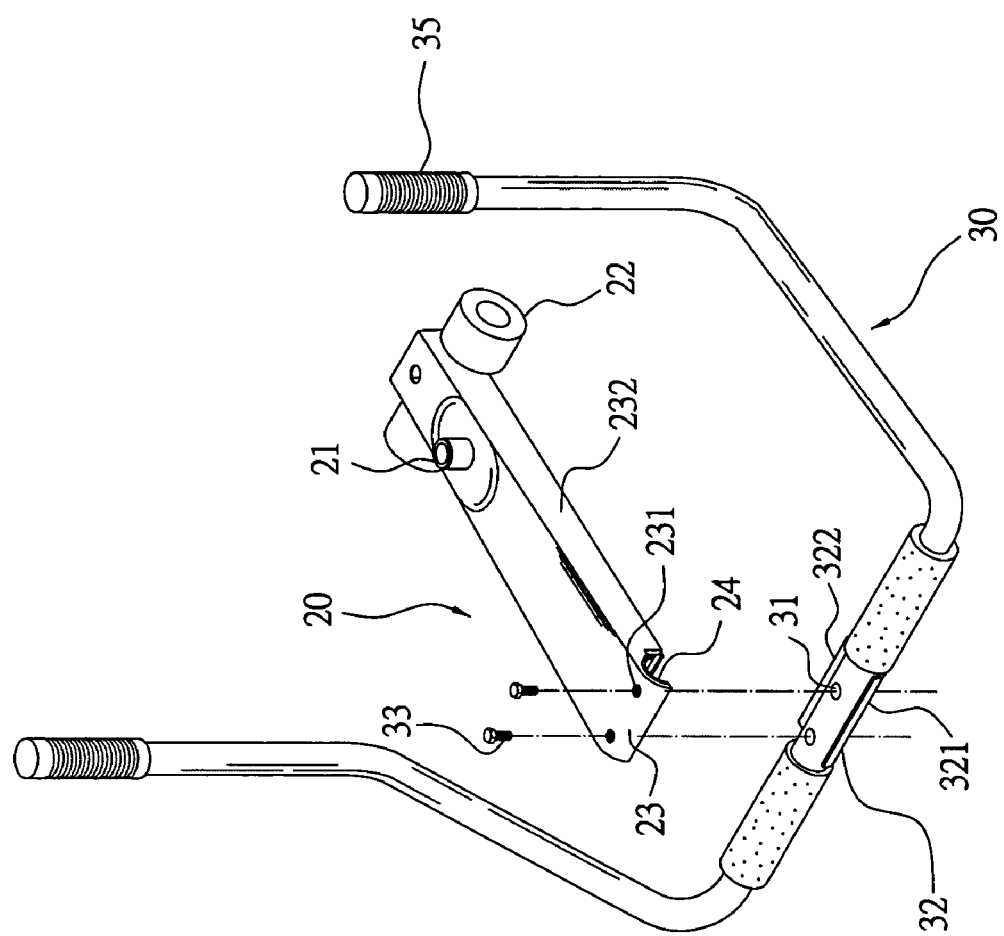
FIG. 3 is a partial exploded perspective view of the child's swaying bike in the present invention.
Figure 4:
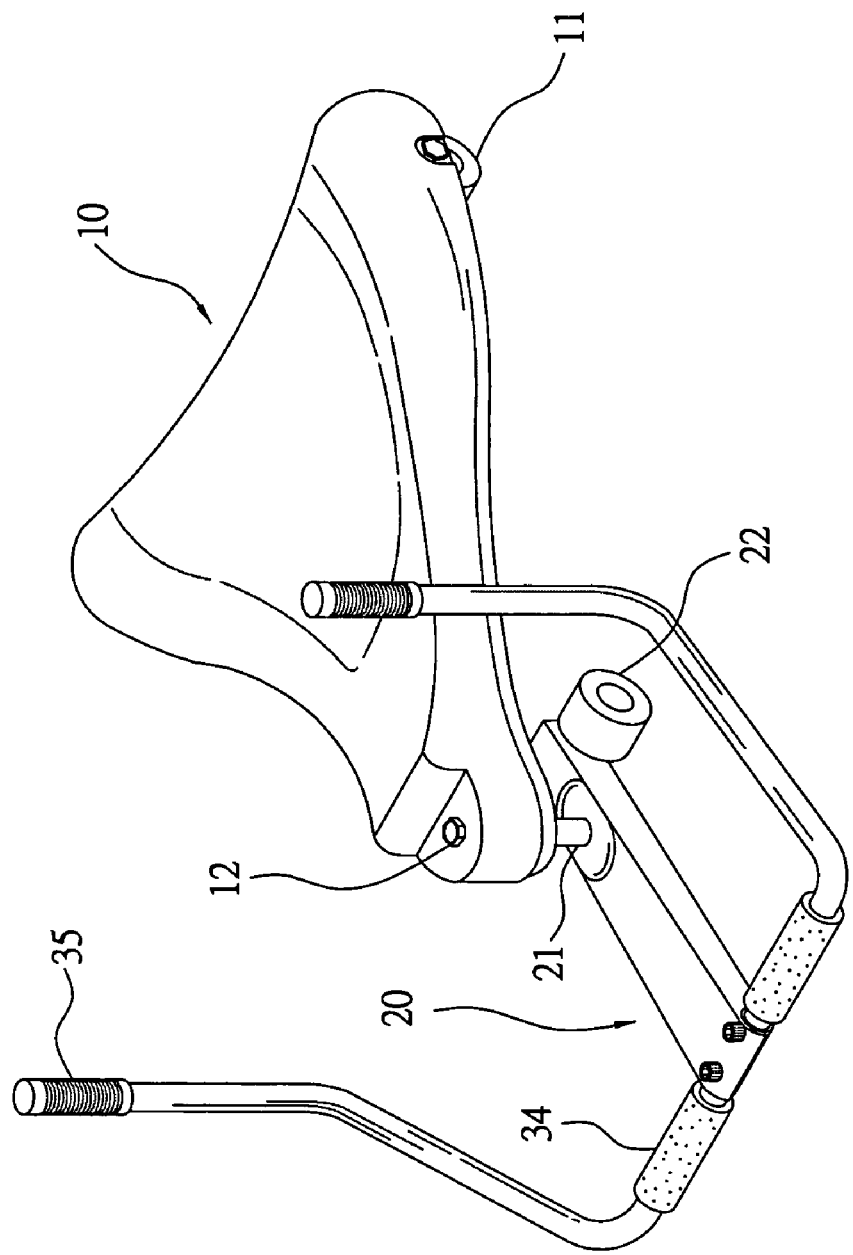
FIG. 4 is a perspective view of the child's swaying bike in the present invention.
Figure 5:
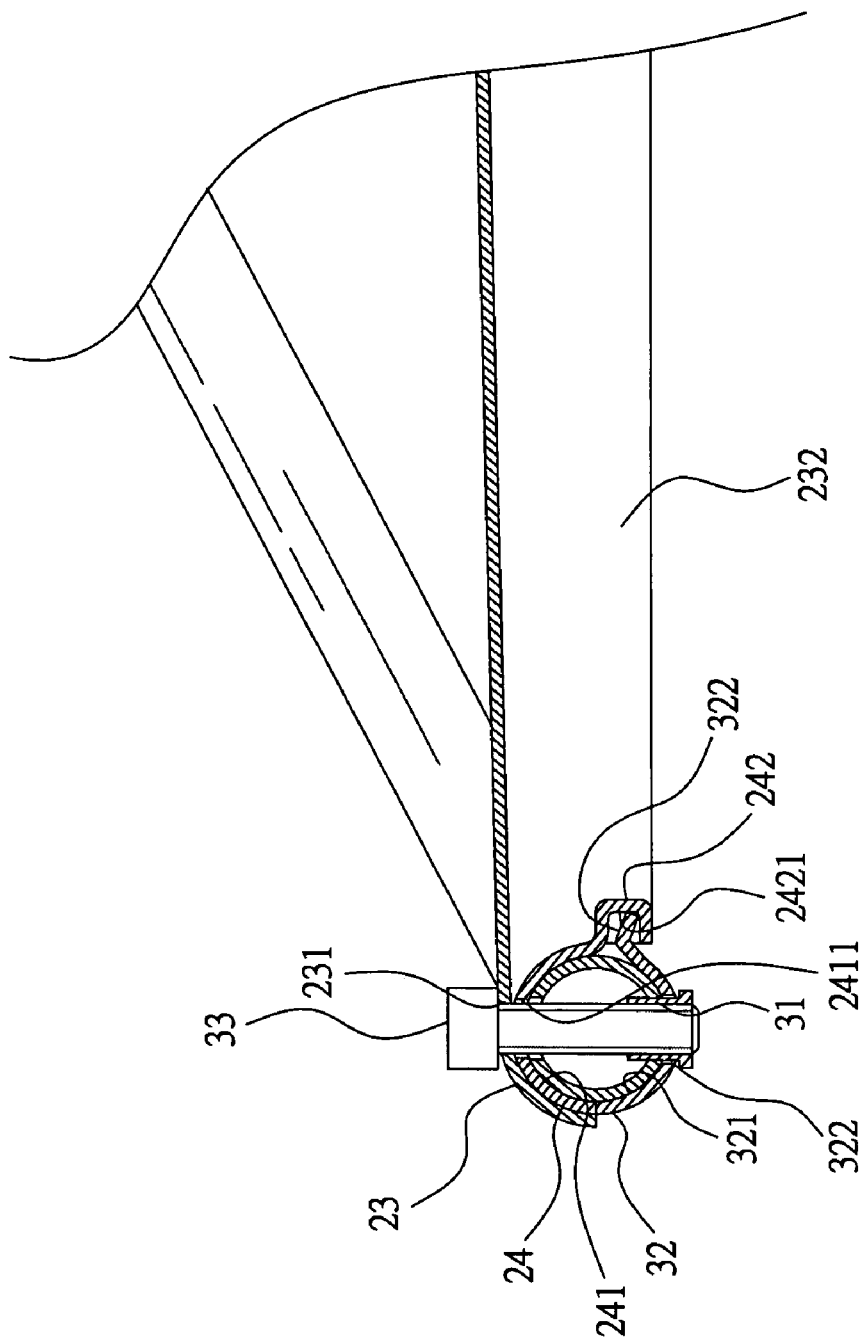
FIG. 5 is a partial cross-sectional view of the child's swaying bike in the present invention.

A preferred embodiment of a child's swaying bike in the present invention, as shown in FIGS. 3, 4 and 5, includes a seat 10, a center rod 20 and a handlebar 30 as main components combined together.

The seat 10 has a proper shape for a rider to sit on, two rear rollers 111 provided at the rear portion of its bottom, a pivotal hole 12 formed at the front end.

The center rod 20 has a pivot 21 standing upright on a rear portion to fit in the pivotal hole 12 of the seat 10, and two front rollers 22 pivotally connected with the rear end. The center rod 20 also has a curved-down front end 23 bored with two holes 231, and a position plate 24 welded on an inner wall and provided with a position plate 241 formed to curve down in the front end. The position plate 241 is bored with two holes 2411 corresponding to the holes 231 of the curved-down front end 23, and an engage member 242 of a ⊂-shape formed in a rear end with a lateral engage groove 2421 formed in the front section. Then the engage groove 2421 has its two sides sealed by the two sidewalls 232 of the curved-down front end 23.

The handlebar 30 is made of a round rod bent integral to have an intermediate horizontal portion and two L-shaped side portions extending from the two ends of the intermediate portion. Then two holes 31 are bored spaced apart in a center section of the intermediate horizontal portion, corresponding to the two holes 231 of the curved-down front end 231 of the center rod 23, a position plate 32 attached around the lower surface of the section bored with the two holes 31 and having a semi-circular portion 321 welded with the body of the handlebar 30 and an insert member 322 extending rearward from the semi-circular portion 321 and inserting in the engage groove 2421 of the position plate 24 of the center rod 20. The position plate 32 further has two holes 323 facing to the two holes 31 and two threaded short tubes welded in the two holes 323 and extending in the holes 31 for two bolts 33 to screw with and pass through the two holes 231 of the center rod 20 and the holes 2411 of the position plate 24 so as to combine stably the handlebar 30 with the center rod 20. Further, two treading tubes 34 are fitted around the two sides of the combined section of the handlebars 30 with the front end 23 of the center rod 20 for the feet of a rider to tread on. The two L-shaped side portions of the handlebar 30 have respectively a horizontal portion extending from the two ends of the intermediate horizontal portion and an upright portion continuing to extend upright and formed with a grip 35 in the upper end. As the two grips 35 are upright and spaced apart for a substantially long distance from the chest of a rider for comfortably gripping and moving by the hands of a rider.

In assembling, as shown in FIG. 6, the insert member 322 of the position plate 32 is inserted in the engage groove 2421 of the position plate 24 of the center rod 20, with the two sides of the engage groove 2421 sealed by the two sidewalls of the curved-down front end 23, preventing the handlebar 30 from sliding off the center rod 20. At the same time the grips 35 of the handlebars 30 are located at the rear side of the connected section of the handlebars 30 and the center rod 20, with the center of gravity being located behind the connected section. Thus if the handlebar 30 is released, the handlebars 30 may rotate with the inserted point of the engage groove 2421 of the position plate 24 functioning as a fulcrum until the position plate 32 of the handlebars 30 is stopped by the front edge of the position plate 24. Then the handlebar 30 may rest smoothly on the fitting portion 241 of the position plate 24 of the center rod 20, naturally secured on the center rod 20 by the gravity. So the handlebars 30 and the center rod 20 can be combined firmly together by the bolts 33 with simple handling and quickness.

Figure 7:
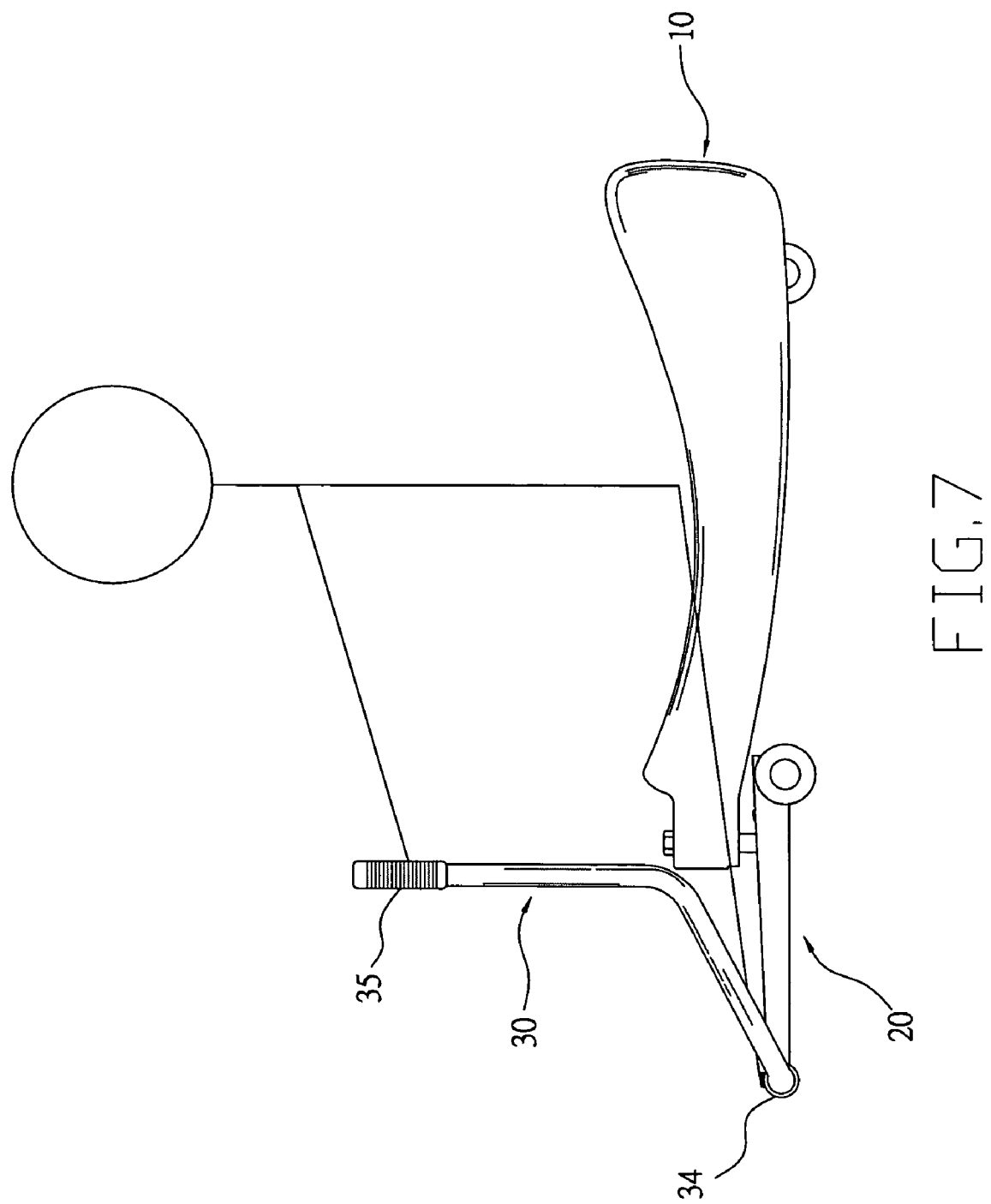
FIG. 7 is a side view of the child's swaying bike in a used condition in the present invention; and, FIG. 8 is a perspective view of the child's swaying bike in a collapsed condition in the present invention.

In using, as shown in FIG. 7, when a child sits on the seat 10, with the feet resting on the treading members 34 and with the hands gripping the grips 35, the rider can sway the handlebar 30 together with the center rod 30 to the right side and the left repeatedly. Then the swaying bike can be forced to move forward in a swaying mode.

As the grips 35 are located at a proper distance from the two sides of the rider's chest, the rider's body does not need to incline to the front side for gripping the grips 35, which are visible owing to their location being just in front of the two eyes of the rider. So the structure of the child's swaying bike conforms to ergonomical design. Therefore, a child can enjoy riding this swaying bike as much as possible, because the child's hands do not easily collide with possible obstacles and the increased safety and riding effect over a conventional child's swaying bike.

Figure 8:
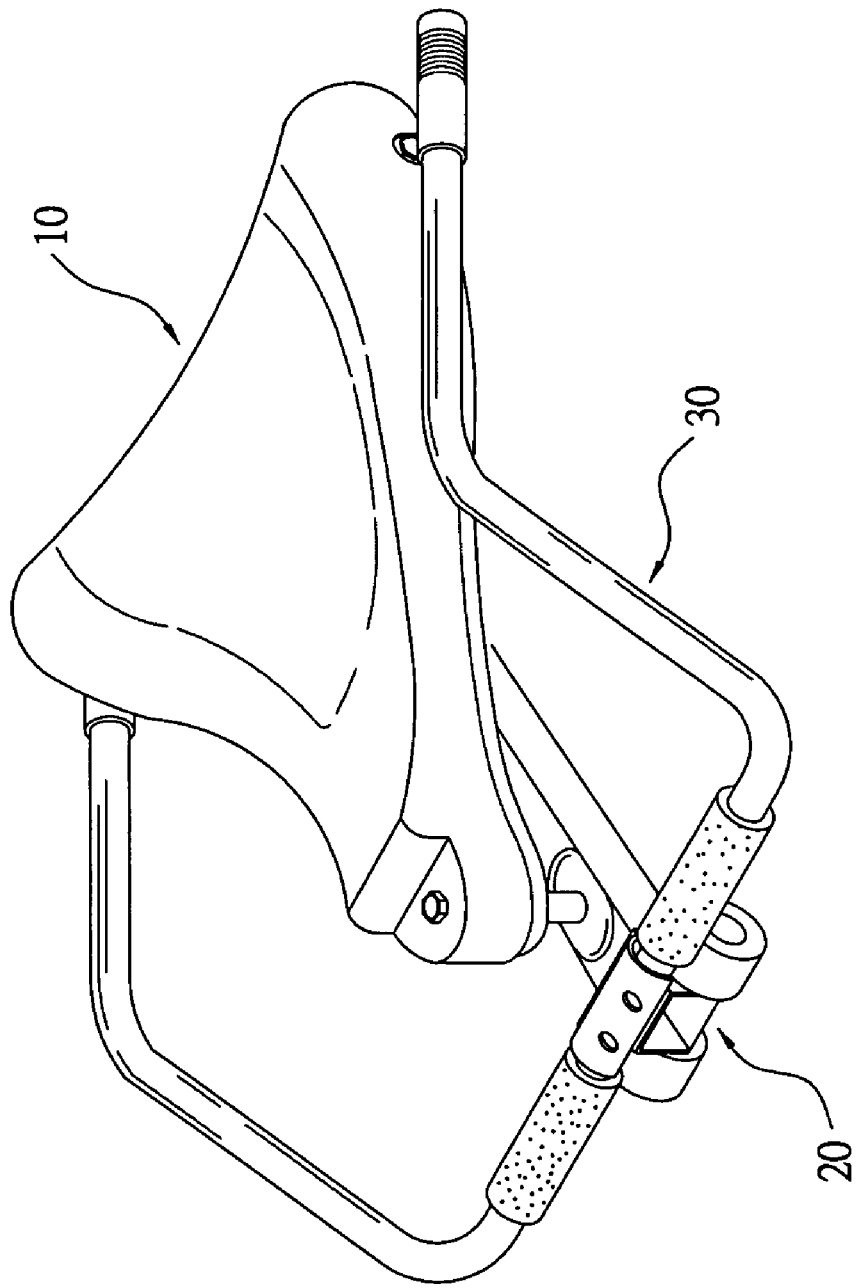

Next, as shown in FIG. 8, the handlebar 30 is separable from the center rod 20, and in packaging and transporting, the handlebar 30 is taken off the center rod 20, and the center rod 20 is turned around to lie in the seat 10, with the handlebar 30 laid down to surround the seat 10 and the center rod 20. Then the collapsed child's swaying bike becomes a very small size for benefit of packaging and transportation.

While the preferred embodiment of the invention has been described above, it will be recognized and understood that various modifications may be made therein and the appended claims are intended to cover all such modifications that may fall within the spirit and scope of the invention.

What is claimed is:

1. A child's swaying bike comprising a seat, two rear rollers provided at a rear side of the bottom of said seat, a center rod rotatably connected to a front end of said seat, two front rollers pivotally connected with a rear end of said center rod, a handlebar combined with a front end of said center rod; said seat moving forward by repeated swaying of said center rod to the right and the left; and, characterized by said center rod having a position plate formed in its front end, said position plate having a curved-down semi-circular fitting portion, a ⊂-shaped engage member formed to extend rearward from said fitting portion, a lateral engage groove formed in a front portion of said engage member, two sides of said engage groove sealed properly; said handlebar made of a round rod and bent to have an intermediate horizontal portion and two L-shaped portion extending from two ends of said intermediate horizontal portion, each said L-shaped portion having a horizontal portion and an upright portion extending from a rear end of said horizontal portion, each said upright portion having a grip formed in an upper end, a position plate fixed on a center section of said intermediate horizontal portion of the handlebar, an insert member extending rearward from said position plate and inserting in said lateral engage groove of said position plate of said center rod so that said handlebar is combined stably with said center rod, two treading tubes fixed respectively around two sides of said position plate of said handlebar:

wherein said handlebar and said center rod are combined together in a limited position by said position plates of said center rod and said handlebar so that the center of gravity of said handlebar may be located at a rear section, said handlebar quickly positioned in place and permitting assembly of said child's swaying bike to be carried out easily without any support, the curvature of said handlebar conforming to an ergonomical design to let a child ride safely and stably on said child's swaying bike and sway it to move forward.

2. The child's swaying bike as claimed in claim 1, wherein said center rod has a curved-down front end bored with two holes, and said position plate of said center rod welded on an inner wall of said curved-down front end, said fitting member of said position plate having two holes corresponding to said two holes of said curved-down front end, said engage groove of said position plate sealed by two sidewalls of said curved-down front end.

3. The child's swaying bike as claimed in claim 2, wherein said intermediate horizontal portion of said handlebar has two holes bored in the center section corresponding to said two holes of said curved-down front end of said center rod, said position plate of said handlebar welded on the bottom wall of said center section with said two holes, said position plate having a curved semi-circular portion welded with said intermediate horizontal portion, said curved semi-circular portion having two holes corresponding to said two holes of said center section, a threaded tube welded respectively in said two holes of said semi-circular portion and extending in said two holes of said curved-down front end and said two holes of said position plate so as to combine firmly said handlebar with said center rod with bolts screwing with said threaded tubes.

\* \* \* \* \*